Nov. 7, 1939.    E. M. CLAYTOR    2,178,679
WIND WHEEL GENERATOR
Filed March 7, 1938
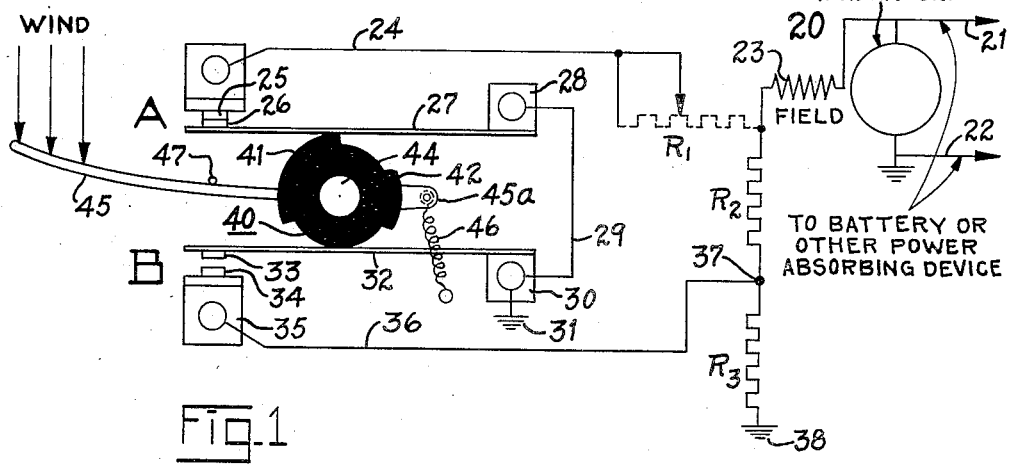
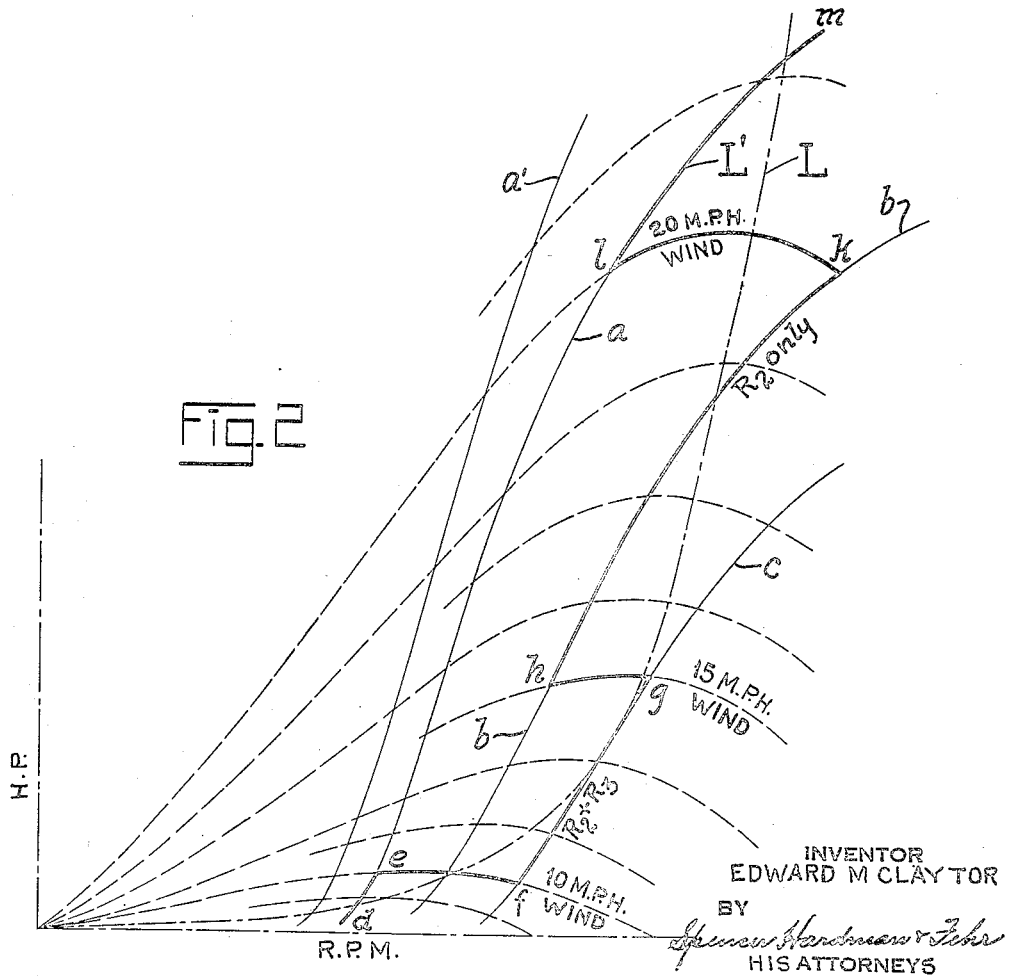
INVENTOR
EDWARD M CLAYTOR
BY
HIS ATTORNEYS Patented Nov. 7, 1939

2,178,679

UNITED STATES PATENT OFFICE 2,178,679

WIND WHEEL GENERATOR

Edward M. Claytor, Anderson, Ind., assignor to General Motors Corporation, Detroit, Mich., a corporation of Delaware Application March 7, 1938, Serial No. 194,283

3 Claims. (Cl. 290—44)

This invention relates to electrical generating plants operated by wind wheels.

It is an object of the present invention to obtain greater efficiency of operation of wind wheel electrical generating plants than heretofore possible.

It has been the practice of wind-generator companies to demand a very low generator cut-in speed, believing that would give better results because some generator output, such as charge to storage battery, though small, would be obtainable at very low wind speeds of 6 to 8 miles per hour. Very little attention has been given to generator operating speeds at high wind velocities and the relation of such generator speed to the propeller speed at which maximum H. P. is delivered for a given wind speed. The peak of the propeller H. P. output curve is the desired point of operation, but so much thought has been given to low cut-in speed that a great sacrifice of propeller H. P. has been made because of the steepness of the curve representing generator input H. P. for low cut-in speed generators. Heretofore, generator curve has been intersecting the propeller curve considerably ahead of the peak; that is, the stable operating point being at the intersection of the two curves, the propeller was prevented from increasing its speed to a value where it could deliver its greatest H. P.

A study of the shape of propeller output H. P. curves and also of generator H. P. input curves led me to realize the importance of fitting the two curves together to get the most economical combination. For example, if I were given the H. P. speed curves for a given propeller, I would construct the generator so that it would have an H. P. input curve that would lie nearer to the peak points of the propeller curves for various wind velocities of medium low values. Such a step in generator construction would be an improvement over the trade practice to date, but that is not enough. Much better results are possible, but not in the generator construction alone. The shape of the ideal curve representing generator H. P. input would be a curve that varied between the second and third power of speed. This is because such curve would coincide with the loci of maximum points of the output H. P. curves of the propeller for various wind velocities.

In view of the above I propose an automatic means for shifting the generator input H. P. curve, said means being responsive to wind velocity. By so doing, I provide a way to make the generator input H. P. curve approximate the loci of the maximum H. P. points on the propeller curves. One specific way of changing the generator curve is to insert external resistance in the field circuit at moderate winds and to short out that resistance at the high wind velocities.

Further objects and advantages of the present invention will be apparent from the following description, reference being had to the accompanying drawing wherein a preferred embodiment of the present invention is clearly shown.

In the drawing:

Fig. 1 is a wiring diagram of a generator controlled system for wind-driven generator power plants embodying the present invention.

Fig. 2 is a chart of curves illustrating how the control system shown in Fig. 1 operates to control the generator input so that its H. P. speed input line will approximate the loci of maximum points of the output H. P. curves of the propeller for various wind velocities.

Referring to Fig. 1, 20 designates a wind wheel operated generator which supplies current through lead wires 21 and 22 to a storage battery or other power-absorbing device, not shown. The generator has a field winding 23 in circuit with resistance elements $R_1$, $R_2$ and $R_3$, which are controlled in a manner such as to effect the most efficient operation of the generator when driven by the wind wheel. Resistance $R_1$ is provided with a manual control for purposes of making an initial adjustment to adapt the generator for use with a given propeller or in a certain location. Resistance $R_1$ is connected by wire 24 with stationary contact 25 engaged by movable contact 26 carried by a spring contact arm 27 fixed to a terminal 28 connected by wire 29 with a terminal 30 grounded at 31. Terminal 30 is connected with a spring contact arm 32 carrying a contact 33 engageable with a contact 34 connected with terminal 35 connected by wire 36 with a terminal 37 connected with resistances $R_2$ and $R_3$. Resistance $R_3$ is grounded at 38. The switch arms 27 and 32 are biased so as to move the movable contacts away from their respective stationary contacts. These arms are operated by a non-conducting cam 40 having lobes 41 and 42 and carried by shaft 44 which is actuated by wind vane 45. A spring 46 attached to an extension 45a of arm 45 normally urges the arm 45 against a stop 47.

The wind switch provides for the control of two circuits by means of two switches controlled by single vane 45 through the inter-position of a cam 40. The switch including contacts 25 and 26 will be referred to hereinafter as switch A. The switch including contacts 33 and 34 will be referred to hereinafter as switch B. The details of construction of the wind switch are shown only diagrammatically in this application. A preferred form of switch which is adaptable for the purposes of the present invention is described and claimed in my copending application Serial No. 193,030, filed February 28, 1938.

Before describing the operation of the wind switch shown in Fig. 1, I will refer to Fig. 2, which is a chart of curves based on H. P. and speed. The curves drawn with dash lines are the propeller output H. P. curves for various wind velocities. The curve L drawn with a dot-dash line is the locus of maximum points on the output H. P. curves of the propeller for various wind velocities. The ideal to be obtained would be so to control the generator that its H. P. input curve would coincide with curve L. As will presently be explained, the present invention provides for the control of the generator so that its input of H. P. curve is the heavy zig-zag line marked L' which includes sections $d—e$, $e—f$, $f—g$, $g—h$, $h—k$, $k—l$ and $l—m$. It will be noted that this line includes portions of the propeller H. P. curves and portions of curves $a$, $b$ and $c$ which are the generator input curves resulting from the use of none or some of the resistance $R_1$, $R_2$ and $R_3$ in circuit with the generator field winding 23.

Curve $a$ is the H. P. input curve for a generator of normal design with no external resistance in the field circuit. If the generator were one which had a H. P. input line with a relatively steep slope such as represented by the curve $a'$, it would be necessary to insert the variable resistance $R_1$ and to adjust it in such a way as to cause the generator characteristic to follow the curve $a$. The curve $b$ shows the generator H. P. input characteristic when resistance $R_2$ only is in the field circuit. The curve $c$ shows the generator H. P. input characteristic when resistances $R_2$ and $R_3$ are both in the generator field circuit in series.

Normally the switch A is closed and the switch B is open, as shown in Fig. 1. The resistances $R_2$ and $R_3$ are short circuited and the only external resistance in the field circuit is $R_1$ which will be zero for a normal generator or a predetermined amount for a generator having a generator characteristic represented by the curve $a'$. At any rate the generator characteristic will initially be that represented by the curve $a$. The generator characteristic will be that represented by the portion $d—e$ of the zig-zag line L'. This characteristic will continue until the wind velocity is 10 M. P. H. When the velocity of the wind exceeds 10 M. P. H. the vane 45 will commence to move against the resistance of the spring 46 and the cam lobe 41 will move away from the spring contact arm 27, thereby opening the switch A. Between 10 and 15 M. P. H. the switch A will be open and also the switch B will remain open. Therefore both resistances $R_2$ and $R_3$ will be connected in the field circuit while $R_1$, if used, will be open-circuited. The opening of switch A while switch B is open causes the generator characteristic to shift from $d—e$ over to $f—g$, which is a portion of the curve $c$. When 15 M. P. H. wind velocity is exceeded the vane will have been moved sufficiently to bring the lobe 41 into engagement with the spring-arm 32 while the lobe 41 remains out of engagement with the spring arm 27. This causes switch B to be closed thereby causing resistance $R_3$ to be short-circuited. Therefore the generator characteristic will shift at 15 M. P. H. to the line $h—k$, which is a portion of the curve $b$. At 20 M. P. H. wind velocity the vane 45 will have moved so as to bring the lobe 42 into engagement with the spring contact 27 while the lobe 41 remains in engagement with the spring arm 32, thereby causing the switches A and B to be closed. Therefore, resistances $R_2$ and $R_3$ will be short circuited. The only resistance in the field circuit will be the normal resistance which will be $R_1$ if any such resistance is needed to make the generator follow the line $a$ under these conditions. Therefore, at a speed in excess of 20 M. P. H. the generator input characteristic will follow the line $l—m$, which is a portion of the curve $a$.

From the foregoing description of the construction and mode of operation of the present invention it is apparent that I have provided for the control of resistances in the field circuit of the generator in such manner that the generator H. P. input characteristic approximates the loci of maximum points on the output H. P. curves of the propeller for various wind velocities. While this characteristic is only an approximation of the loci, it indicates a performance which is much better than has been obtained heretofore in wind operated electric generating plants. At least I am able to control the system so that the propeller is not prevented from increasing its speed to an amount where it could deliver its greatest H. P. To begin with I remove the resistance from the generator field in order that the generator may be effective at low wind velocity to produce current as represented by the line $d—e$. But if I continued to permit resistance to remain out of the generator field circuit I would prevent the propeller from increasing its speed to a point where it would carry the load although the wind velocity increased from 10 to 15 M. P. H. Therefore, at 10 M. P. H. wind velocity, I introduce the maximum resistance $(R_2+R_3)$ from the field circuit so as to unload the propeller thereby permitting it to come up to the maximum R. P. M. at 15 M. P. H. wind velocity. Then I partially load the propeller by cutting out the resistance $R_3$ above 15 M. P. H. The propeller carries this load as represented by the line $h—k$ which approximately passes through the peaks of the propeller H. P. output curves. At 20 M. P. H. the line $h—k$ intersects the 20 M. P. H. curve beyond its maximum. If the generator were to continue on the line $b$ at peak speeds corresponding to wind velocity above 20 M. P. H. then the power being developed by the propeller would not be used efficiently. Therefore, at 20 M. P. H. wind velocity I add more load to the propeller by decreasing the generator field resistance. Above 20 M. P. H. wind velocity the field resistance is only that of resistance $R_1$.

Therefore, the plant is operated efficiently by adjusting the loading of the propeller to what the propeller is capable of carrying at various wind velocities. The line L' could be made to approximate more closely the line L by making more frequent changes in resistance of the generator field circuit as the wind velocity changes. This could be accomplished by increasing the number of resistance elements to control field current, and the number of switches for controlling the resistance elements and the number of cam lobes on the cam 40.

While the embodiment of the present invention as herein disclosed, constitutes a preferred form, it is to be understood that other forms might be adopted, all coming within the scope of the claims which follow.

What is claimed is as follows:

1. The method of controlling a wind wheel operated electrical generating plant which consists in operating the generator at relatively low wind velocities with relatively little external resistance in the field circuit, then, at velocities above a predetermined relatively low value, in inserting a substantial resistance in the generator field circuit so as to permit the propeller to carry its load efficiently at wind velocities increasing above the predetermined relatively low value, and in decreasing the external resistance in the field circuit by stages as the wind velocity increases substantially above the predetermined relatively low wind velocity.

2. A system of control for a wind wheel operated generator comprising a plurality of resistance units external to the generator field winding, a plurality of switches for controlling the connections of the resistances to the field circuit, a wind operated vane and a cam operated by the vane and having its lobes so arranged with respect to the switches that the resistances are so cut in and out of the generator field circuit at various wind velocities that the generator input H. P. curve approximates the loci of maximum points of the output H. P. curves of the propeller for various wind velocities.

3. A system of control for a wind wheel operated generator comprising a plurality of resistance units external to the generator field winding, a plurality of switches for controlling the connections of the resistances to the field circuit, a wind operated vane and a cam operated by the vane and having its lobes so arranged with respect to the switches that the resistances are so cut in and out of the generator field circuit at various wind velocities that the external field resistance will be relatively low at relatively low wind velocities and up to a predetermined low value, for example, 10 miles per hour wind velocity, and that the external field resistance will be relatively high for wind velocities above the predetermined low value and up to a certain higher value, for example between 10 and 15 miles per hour wind velocity, at which certain higher value the field resistance is reduced in stages as wind velocity further increases.

EDWARD M. CLAYTOR.